(No Model.)

L. FILSTRUP.
ELECTRIC LIGHT FIXTURE.

No. 508,006. Patented Nov. 7, 1893.

Witnesses
W. Rossiter
Frank J. Stack

Inventor
Larsen Filstrup
By W. Knox Haynes
Atty.

UNITED STATES PATENT OFFICE.

LARSEN FILSTRUP, OF CHICAGO, ILLINOIS.

ELECTRIC-LIGHT FIXTURE.

SPECIFICATION forming part of Letters Patent No. 508,006, dated November 7, 1893.

Application filed August 12, 1891. Serial No. 402,491. (No model.)

*To all whom it may concern:*

Be it known that I, LARSEN FILSTRUP, a citizen of the United States, and a resident of the city of Chicago, in the county of Cook and State of Illinois, have invented a certain new and useful Improvement in Incandescent-Electric-Light Fixtures, of which I declare the following to be a full, accurate, and complete specification.

My invention relates to ornamental metal fixtures used to support or suspend incandescent electric lights, which fixtures are usually constructed with an internal channel through which the wire carrying the current, is conveyed to the globe or bulb.

My invention relates to the formation of a joint in a channeled tube or pipe through which the said wire may pass.

The object which I desire to attain is a flexible joint therein, which will enable the same to be turned in any possible direction without stretching or injuring the wire. I attain this object by the mechanism illustrated in the accompanying drawings.

Figure 1:
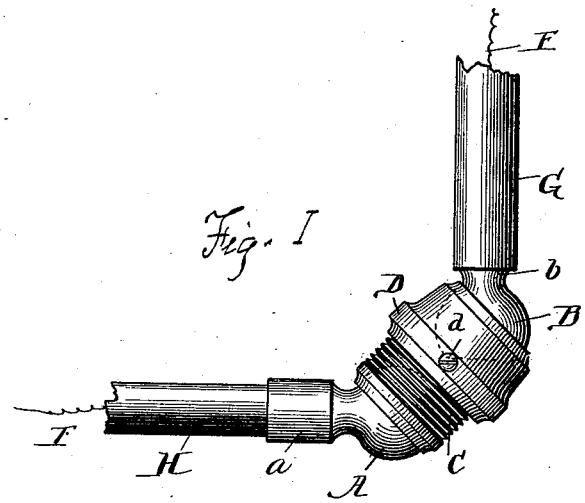
Figure 2:
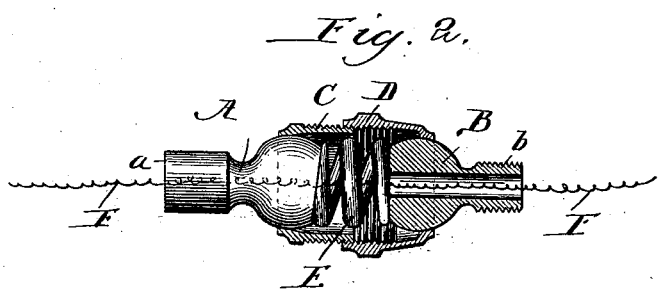

Figure 1, of said drawings is an external view of a section of pipe or tubing equipped with a joint, the subject of my invention, the said joint turned to an angle of ninety degrees. Fig. 2 is a face elevation of said joint, certain parts thereof being shown in section.

In the several figures, like letters of reference indicate like parts.

A and B are the several balls or ball-shaped extremities.

C and D are the several ends of a shell constructed to form a socket at its respective ends, for the balls A and B.

E is a spiral spring placed within the shell formed of the parts C and D, between the balls A and B.

F is an electric wire passing through the tube and joint.

*a* and *b* are the external ends of the parts A and B.

*d* indicates a screw passing through the part D, and adapted, when the parts C and D are screwed together, to bear on the outer surface of part C and thus prevent them from unscrewing.

The parts A and B are constructed with an internal channel through which the wire F may pass. The part B is shown in section in Fig. 2, and the formation of the internal channel is there shown.

In constructing the joint, the subject matter of my invention, the balls A and B are placed end to end, and the spring E is placed between them, thus forming a continuous channel or conduit for the wire F through the parts A and B, and through the interior of the coil spring E, all as shown in Fig. 2. The encircling shell is constructed of two parts, C and D, which are placed over the balls and spring, and screwed together until the proper tension is obtained by the spring E, thus constructing a joint with a continuous channel through the same to convey the wire; which joint may be bent in any desired direction to any desired angle.

Having thus described the component parts, the structure, the utility, and the manner of operation of my invention, I claim and desire to obtain a patent for the following, to wit:

In a flexible joint for conveying wires for incandescent lamps, the combination of a male shell having a socket, and externally threaded, a female shell having a socket, and internally threaded to permit an adjustable connection of the two shells, the female shell having also an exterior milled surface, and a set screw for maintaining the adjustable relation of the shells, balls adjustable within the sockets, and provided with screw threaded extensions, said balls and their extensions being centrally perforated to receive the wires, and a coil spring within the shells and interposed between the balls, the combination being and operating, substantially as set forth.

In witness whereof I have hereto affixed my signature, this 30th day of July, A. D. 1891, at the city of Chicago, in the State of Illinois, in the presence of two subscribing witnesses.

LARSEN FILSTRUP.

In presence of—
W. KNOX HAYNES,
H. CARSTEN.